(12) United States Patent
Yoshida

(10) Patent No.: US 11,703,831 B2
(45) Date of Patent: Jul. 18, 2023

(54) CONTROL SYSTEM, CONTROL APPARATUS, AND METHOD OF ACCESSING FIELD DEVICE

(71) Applicant: YOKOGAWA ELECTRIC CORPORATION, Tokyo (JP)

(72) Inventor: Yoshitaka Yoshida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 145 days.

(21) Appl. No.: 17/166,478

(22) Filed: Feb. 3, 2021

(65) Prior Publication Data
US 2021/0302942 A1   Sep. 30, 2021

(30) Foreign Application Priority Data

Mar. 26, 2020 (JP) .............................. JP2020-055910

(51) Int. Cl.
*G05B 19/418* (2006.01)
*H04L 67/125* (2022.01)

(52) U.S. Cl.
CPC ... *G05B 19/4183* (2013.01); *G05B 19/41855* (2013.01); *H04L 67/125* (2013.01)

(58) Field of Classification Search
CPC .......... G05B 19/4183; G05B 19/41855; G05B 19/4186; G05B 2219/32252; H04L 67/125; Y02P 90/02
See application file for complete search history.

(56) References Cited

U.S. PATENT DOCUMENTS

| 9,261,868 | B2 | 2/2016 | Torigoe | |
| 2004/0170138 | A1* | 9/2004 | Blevins | G05B 19/0423 370/328 |
| 2006/0143439 | A1* | 6/2006 | Arumugam | G06Q 10/08 713/153 |
| 2007/0280285 | A1* | 12/2007 | Vanderah | H04L 12/66 370/466 |
| 2008/0031139 | A1* | 2/2008 | Muro | H04W 28/10 370/237 |
| 2009/0292524 | A1 | 11/2009 | Anne et al. | |
| 2010/0026514 | A1* | 2/2010 | Becker | G01D 21/00 340/8.1 |

(Continued)

FOREIGN PATENT DOCUMENTS

| JP | 61-54510 A | 3/1986 |
| JP | 2001-5684 A | 1/2001 |

(Continued)

*Primary Examiner* — Tuan C Dao
(74) *Attorney, Agent, or Firm* — Rankin, Hill & Clark LLP

(57) ABSTRACT

A control system includes at least one field device, a first control apparatus, a second control apparatus, and a network. The first control apparatus has a first field device, included among the one or more field devices, directly connected thereto and includes a first access route controller and a first control application capable of controlling the first field device. The second control apparatus includes a second access route controller and a second control application capable of controlling the first field device. The first access route controller and the second access route controller are configured to work together to control an input/output route from the first control application and the second control application to the first field device.

13 Claims, 12 Drawing Sheets

(56) References Cited

U.S. PATENT DOCUMENTS

| | | | |
|---|---|---|---|
| 2011/0095914 A1* | 4/2011 | Velado | B63J 99/00 340/984 |
| 2011/0191500 A1* | 8/2011 | Odayappan | G05B 19/0426 710/8 |
| 2013/0179697 A1* | 7/2013 | Nicholas | G06F 1/30 713/300 |
| 2015/0046710 A1* | 2/2015 | Clish | H04L 9/14 713/169 |
| 2016/0033437 A1* | 2/2016 | Anjum | G05B 15/02 324/664 |
| 2016/0099863 A1* | 4/2016 | Messinger | H04L 41/147 370/218 |
| 2016/0226927 A1* | 8/2016 | Takahashi | H04L 41/0813 |
| 2018/0115457 A1* | 4/2018 | Bonomi | G06F 11/2033 |
| 2018/0321662 A1 | 11/2018 | Nixon et al. | |

FOREIGN PATENT DOCUMENTS

| | | |
|---|---|---|
| JP | 2004-265411 A | 9/2004 |
| JP | 2007-13997 A | 1/2007 |
| JP | 2008-9793 A | 1/2008 |
| JP | 2012-243325 A | 12/2012 |
| JP | 5561298 B2 | 7/2014 |
| JP | 2019-74880 A | 5/2019 |
| JP | 2020-27434 A | 2/2020 |

\* cited by examiner

CONTROL SYSTEM, CONTROL APPARATUS, AND METHOD OF ACCESSING FIELD DEVICE

CROSS-REFERENCE TO RELATED APPLICATION

The present application claims priority to Japanese Patent Application No. 2020-055910 filed Mar. 26, 2020, the entire contents of which are incorporated herein by reference.

TECHNICAL FIELD

The present disclosure relates to a control system, a control apparatus, and a method of accessing a field device.

BACKGROUND

In process control systems within plants, factories, or the like, field devices, such as sensors and actuators, are typically configured for direct connection to a controller. In the present disclosure, a controller to which a field device is directly connected and which functions as an interface with another controller is referred to as an I/O node.

A control application running on the controller performs control calculations using process data read from the sensor and outputs the calculation results to the actuator to control the plant. A known field device or I/O node is logically connected to a control application installed on a predetermined controller, and the combination of the field device, I/O node, controller, and control application cannot be changed for operation. However, this method makes it necessary to stop the system when, for example, replacing controller hardware during operation of the control application. Methods for replacing controller hardware without stopping the system have therefore been proposed. For example, see patent literature (PTL) 1 and 2.

CITATION LIST

Patent Literature

PTL 1: JP5561298B2
PTL 2: US20180321662A1

SUMMARY

A control system according to an embodiment includes one or more field devices configured to perform at least one of acquisition of data for control of a plant and operation of the plant; a first control apparatus, to which a first field device included among the one or more field devices is directly connected, including a first access route controller and a first control application capable of controlling the first field device; at least one second control apparatus including a second access route controller and a second control application capable of controlling the first field device; and a network configured to communicatively connect the first control apparatus and the second control apparatus. The first access route controller and the second access route controller are configured to work together to control an input/output route from the first control application and the second control application to the first field device.

A control apparatus according to an embodiment has directly connected thereto a field device configured to perform at least one of acquisition of data for control of a plant and operation of the plant. The control apparatus includes a control application capable of controlling the field device and an access route controller configured to work together with another access route controller included in another control apparatus, different from the control apparatus, to control an input/output route to the field device from the control application and a control application of the another control apparatus.

A method, according to an embodiment, of accessing a field device is a method to perform input/output by a control apparatus to and from a field device configured to perform at least one of acquisition of data for control of a plant and operation of the plant. The method includes designating, by a control application of the control apparatus, an input/output unit of the field device and issuing an input/output instruction; acquiring, by an access route controller of the control apparatus, position information for the designated field device; and performing input/output, when the field device is connected to another control apparatus based on the position information, to and from the field device via an access route controller of the another control apparatus to which the field device is connected.

DETAILED DESCRIPTION

Figure 1:
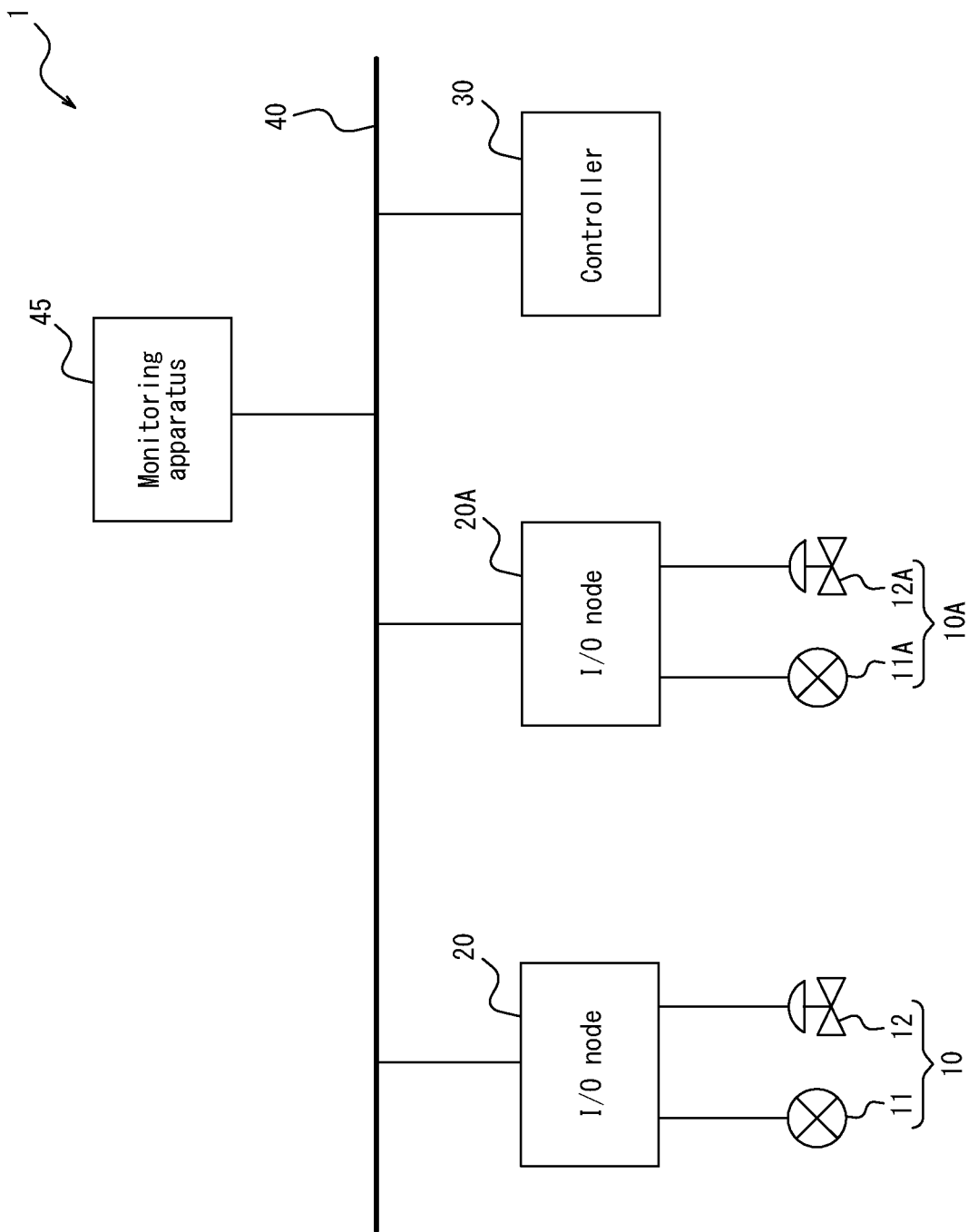
FIG. 1 is a schematic diagram illustrating an example control system according to a first embodiment.

The present disclosure relates to a control apparatus that includes an access route controller that works together with the access route controller of another control apparatus, a control system including the control apparatuses, and a method of accessing a field device.

The present disclosure provides a control system, a control apparatus, and a method of accessing a field device that can perform input/output to and from a field device by an appropriate method regardless of the position of a control application.

A control system according to an embodiment includes one or more field devices configured to perform at least one of acquisition of data for control of a plant and operation of the plant; a first control apparatus, to which a first field device included among the one or more field devices is directly connected, including a first access route controller and a first control application capable of controlling the first field device; at least one second control apparatus including a second access route controller and a second control application capable of controlling the first field device; and a network configured to communicatively connect the first control apparatus and the second control apparatus. The first access route controller and the second access route controller are configured to work together to control an input/output route from the first control application and the second control application to the first field device. When the first and second access route controllers are provided to control the input/output route from the first control application and the second control application to the first field device in this way, input/output to and from the field device can be performed by an appropriate method regardless of the position of the control application.

In an embodiment, the first access route controller and the second access route controller may be configured to be capable of switching between a first state such that the first control application performs input/output to and from the first field device and a second state such that the second control application performs input/output to and from the first field device. When the first state and the second state can be switched between in this way, the control application can be switched between the first control apparatus and the second control apparatus without stopping the system.

In an embodiment, the first access route controller and the second access route controller may be configured so that a method for the first control application to specify an input/output unit of the first field device and a method for the second control application to specify an input/output unit of the first field device are identical. When the first access route controller and the second access route controller are configured so that the first control application and the second control application specify an input/output unit of the first field device by the same method in this way, the same control application can be transferred between the first control apparatus and the second control apparatus without changing settings.

In an embodiment, the first control application and the second control application may be configured to specify the input/output unit of the first field device by a unique name. When the first control application and the second control application specify the input/output unit of the first field device by a unique name in this way, the field device can be specified regardless of the physical position of the control application.

In an embodiment, the input/output unit of the first field device may be allocated to a memory area of the first control apparatus, and the first access route controller may be configured to execute an input/output instruction for the first field device from the first control application and the second control application by designating an address of the memory area. When the first access route controller executes an input/output instruction for the first field device from the first and second control applications by designating an address of the memory area in this way, input/output instructions can be processed efficiently even from the second control application.

In an embodiment, the second access route controller may be configured to transfer the input/output instruction for the first field device from the second control application to the first access route controller via the network. In this way, an input/output instruction for the first field device from the second control application is transferred to the first access route controller. Input/output instructions even from the second control application can thereby be executed efficiently, without an excessive processing load or communication load, since the first access route controller executes the input/output instructions by designating the address of the memory area to which input/output of the field device is allocated.

In an embodiment, when the first field device is to be replaced, the first access route controller may be configured to fix input/output data stored in the memory area. By the first access route controller fixing the input/output data stored in the memory area at the time of replacement of the first field device, the first field device can be replaced without the need to stop the first control apparatus and the second control apparatus.

In an embodiment, the control system may further include a second field device included among the one or more field devices and directly connected to the network, at least one of the first access route controller and the second access route controller may be configured to be capable of input/output to and from the second field device, and the first access route controller and the second access route controller may be configured to be capable of controlling an input/output route from the first control application and the second control application to the second field device. When at least one of the first access route controller and the second access route controller is configured to be capable of input/output to and from the second field device directly connected to the network, and the first access route controller and the second access route controller are configured to be capable of controlling an input/output route from the first control application and the second control application to the second field device in this way, the second field device as well as the first field device can be incorporated into the control system and controlled.

In an embodiment, the first control apparatus may include a determiner, a plurality of control applications including at least one of the first control application and the second control application may be configured to perform an identical control calculation based on an output value from the first field device and calculate an input value for the first field device to yield a plurality of input values, and the determiner may be configured to determine an input value for the first field device based on the plurality of input values calculated by the plurality of control applications. When the first control apparatus includes a determiner, and the determiner determines an input value for the first field device based on the plurality of input values calculated by the plurality of control applications, the reliability of control by the control system increases.

A control apparatus according to an embodiment has directly connected thereto a field device configured to perform at least one of acquisition of data for control of a plant and operation of the plant. The control apparatus includes a control application capable of controlling the field device and an access route controller configured to work together with another access route controller included in another control apparatus, different from the control apparatus, to control an input/output route to the field device from the control application and a control application of the another control apparatus. When an access route controller is provided and controls the input/output route from the control apparatus and another control apparatus to the first field device in this way, input/output to and from the field device can be performed by an appropriate method regardless of the position of the control application.

A method, according to an embodiment, of accessing a field device is a method to perform input/output by a control apparatus to and from a field device configured to perform at least one of acquisition of data for control of a plant and operation of the plant. The method includes designating, by a control application of the control apparatus, an input/output unit of the field device and issuing an input/output instruction; acquiring, by an access route controller of the control apparatus, position information for the designated field device; and performing input/output, when the field device is connected to another control apparatus based on the position information, to and from the field device via an access route controller of the another control apparatus to which the field device is connected. When the position information for the designated field device is acquired, and the field devices connected to another control apparatus based on the position information in this way, input/output to and from the field device can be performed via the access route controller of the other control apparatus to which the field devices connected. This enables input/output to and from the field device by the same access method regardless of the physical position of the field device.

According to the present disclosure, input/output can be performed to and from a field device by an appropriate method regardless of the position of the control application.

Before embodiments according to the present disclosure are described, a comparative example based on known technology is described.

Comparative Example

PTL 1 proposes a process control system configured so that a control application operates on virtual hardware on a controller not connected to a field device, and the controller connects via a network to a redundant I/O node to which the field device is connected. According to this process control system, the redundant I/O node performs conversion between signals inputted and outputted by the field device and signals communicated with the controller via the network. The control application can thereby operate on any controller and connect to any field device. According to this process control system, hardware of the controller can be replaced, without stopping the system, by temporarily changing the combination of the control application and the controller. In the control system of PTL 1, however, the redundant I/O node does not have a control application installed thereon, and the field device is controlled only by the controller. Therefore, the method of accessing the field device has room for improvement.

Like PTL 1, PTL 2 discloses a control system such that an I/O node, to which a field device is connected, and a controller are connected via a network. The I/O node disclosed in PTL 2 is configured to enable operation of a control application that controls the field device connected to the I/O node. A control application on the controller, which is not connected to the field device of PTL 2, is configured to be capable of access, via the network, to the field device connected to the I/O node. A communication protocol such as OPC Unified Architecture (OPC UA) is used for communication between the controller and the I/O node. Even if the control application of the controller migrates to another controller in the control system of PTL 2, the control application can access the same field device via the network.

To access the field device connected to the I/O node in the control system disclosed in PTL 2, the control application running on the controller executes procedures to access the field device via the network. The control application running on the I/O node that controls the field device connected to the I/O node directly accesses a specific memory address allocated for input/output of the field device and performs input/output of information. Therefore, if the control application running on the controller is installed on the I/O node, the access to the field device becomes network access. An excessive communication load or processing load occurs in this case as compared to when input/output to and from the field device is performed by directly designating a memory address. Furthermore, since access to the field device via the network is not envisioned for the control application that runs on the I/O node, this control application cannot be installed on the controller. To replace the hardware or update the software without stopping the system, the control application preferably performs input/output to and from the field device by an appropriate method regardless of whether the control application runs on the controller or the I/O node.

The present disclosure proposes a control system, a control apparatus, and a method of accessing a field device that can perform input/output to and from a field device by an appropriate method regardless of the position of a control application. The present disclosure also proposes a control system that enables easy control apparatus replacement and load distribution. Embodiments of the present disclosure are described below with reference to the drawings.

First Embodiment

FIG. 1 is a schematic diagram illustrating an example control system 1 according to a first embodiment. The control system 1 includes one or more each of a field device 10, an I/O node 20, and a controller 30, and also includes a network 40. The control system 1 may further include a monitoring apparatus 45. The field device 10 is a first field device. The I/O node 20 is a first control apparatus. The controller 30 is a second control apparatus.

The field device 10 performs at least one of acquisition of data for control of a plant and operation of the plant. The field device 10 is, for example, a sensor 11 such as a temperature sensor or flowmeter or an actuator 12 such as a valve device, a fan, or a motor.

The I/O node 20 is an apparatus to which the field device 10 is directly connected and on which a control application 21 (see FIG. 2) operates. The I/O node 20 is also used as an interface of the field device 10 and the controller 30. When a plurality of I/O nodes 20 are present, each one may be indicated as an I/O node 20 in the explanation below. A specific I/O node 20 among the plurality of I/O nodes 20 is differentiated as an I/O node 20A if the explanation so requires. The field device connected to the I/O node 20A may be referred to as a field device 10A (sensor 11A and actuator 12A).

The controller 30 of the present embodiment is an apparatus to which the field device 10 is not directly connected and on which a control application 31 (see FIG. 2) operates. In the present embodiment, the device such that the field device 10 is directly connected to the controller is assumed to be the I/O node 20. The controller 30 is configured to communicatively connect to the I/O node 20 via the network 40. The controller 30 can access the field device 10 via the I/O node 20 in accordance with the control application 31. The controller 30 can perform input/output of a plurality of field devices 10 connected to the I/O node 20.

The network 40 is an in-plant communication network capable of connecting information devices, such as the I/O node 20, controller 30, and monitoring apparatus 45, inside the plant. The network 40 may include a wired or wireless local area network (LAN). Examples of wired LANs include Ethernet. Examples of wireless LANs include wireless networks compliant with wireless communication standards such as Wi-Fi® or WiMAX® (Wi-Fi and WiMAX are registered trademarks in Japan, other countries, or both). A communication network using a standardized protocol, such as OPC UA or PROFINET, may also be used.

The monitoring apparatus 45 is an apparatus used for monitoring the operation status of the plant overall. The operation state of respective applications may be transmitted from the I/O node 20 and the controller 30 to the monitoring apparatus 45. Operation states of applications include running, stopped, idle, error, and the like. The monitoring apparatus 45 includes a display means and an input means. The monitoring apparatus 45 controls the I/O node 20 and the controller 30 in accordance with operator instructions or programmed procedures. The monitoring apparatus 45 is used to stop the control applications 21, 31 and adjust operations of the applications.

Figure 2:
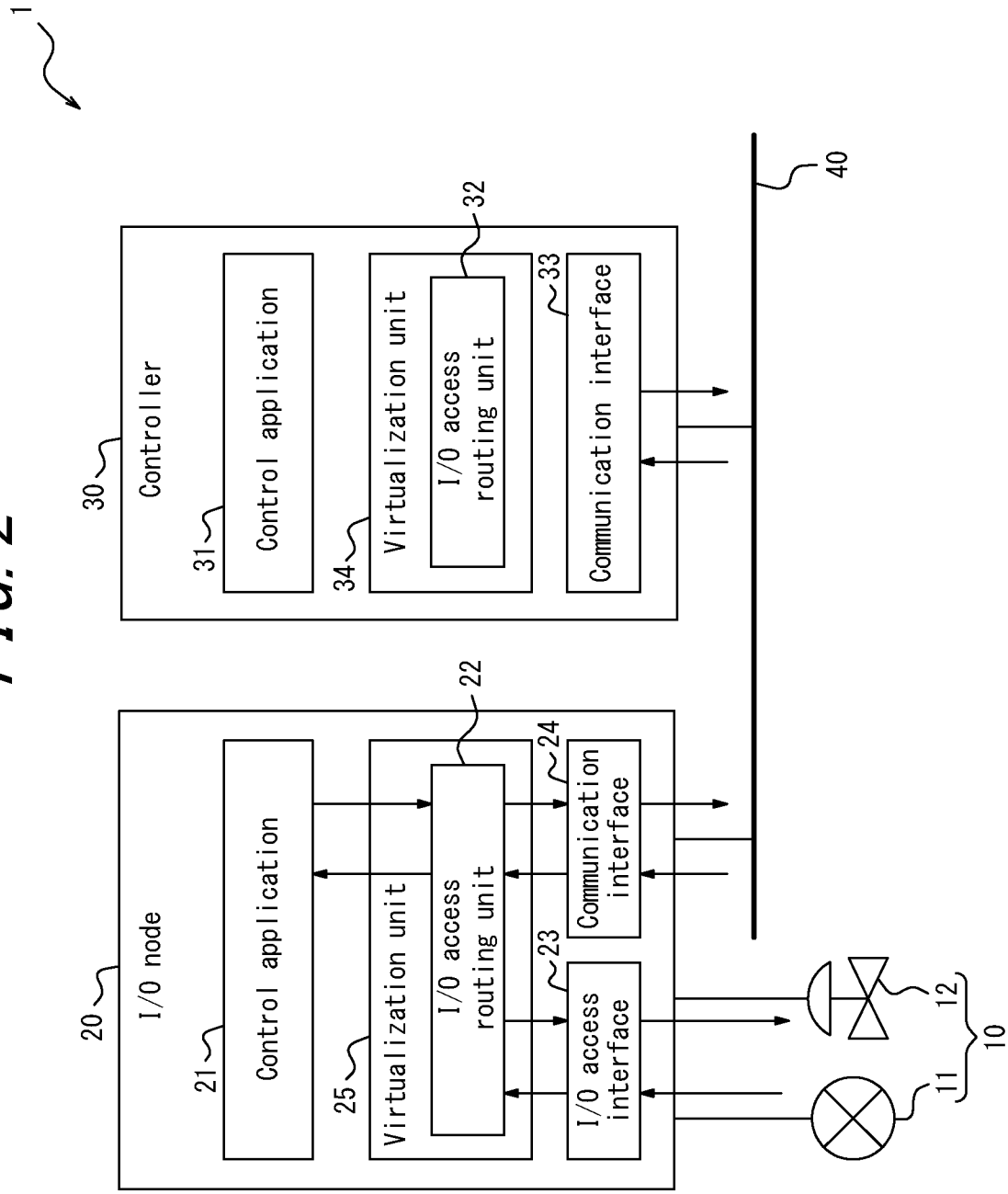
FIG. 2 is a block diagram illustrating an example configuration of the main portion of the control system of FIG. 1.

Next, with reference to FIG. 2, an example configuration of the main portion of the control system 1 is further described.

The I/O node 20 may be configured to include the control application 21, an I/O access routing unit 22, an I/O access interface 23, and a communication interface 24. The control application 21 is a first control application. The I/O access routing unit 22 is a first access route controller. The I/O node 20A illustrated in FIG. 1 also has the same constituent elements as the I/O node 20. The constituent elements of the I/O node 20A may be described below with the same reference signs as those of the constituent elements of the I/O node 20.

The control application 21 can control the field device 10 connected to the I/O node 20. The control application 21 may control a field device 10A connected to another I/O node 20A. The control application 21 may operate on the operating system. The control application 21 performs control of the field device 10 (such as colleting measurement data from the field device 10 and transmitting control data to the field device 10) necessary for performing process control.

The I/O access routing unit 22 provides an abstract I/O access method for the control application 21. The I/O access routing unit 22 adaptively changes the access method in accordance with the physical relationship between the I/O node 20 on which the I/O access routing unit 22 is installed and the field device 10. For abstraction of the hardware, the I/O access routing unit 22 may be included in a virtualization unit 25 inside the I/O node 20. The virtualization unit 25 operates virtually, in place of hardware, on the hardware of the I/O node 20. The virtualization unit 25 is provided to allow replacement of the hardware of the I/O node 20 without need to change the control application 21. The virtualization unit 25 is not, however, essential for providing the functions of the I/O access routing unit 22. The I/O access routing unit 22 can be implemented even without the virtualization unit 25.

The I/O access interface 23 performs processing for data input/output to and from the field device 10 connected to the I/O node 20. The I/O access interface 23 may include a port, circuit, and the like for I/O access.

The communication interface 24 communicates with the I/O node 20A and the controller 30 via the network 40. The communication interface 24 performs necessary communication processing in accordance with the type of network 40. The communication interface 24 may include components such as a physical interface for connecting to the network 40 and a circuit for performing protocol processing or the like.

The controller 30 is configured to include the control application 31, an I/O access routing unit 32, and a communication interface 33. The control application 31 is a second control application. The I/O access routing unit 32 is a second access route controller. The control application 31, the I/O access routing unit 32, and the communication interface 33 have the same or similar functions as the control application 21, the I/O access routing unit 22, and the communication interface 24, respectively, of the I/O node 20. Hence, a description thereof is omitted.

The I/O access routing unit 22 and the I/O access routing unit 32 are configured to work together to control an input/output route from the control application 21 and the control application 31 to the field device 10. In the present disclosure, "work together" refers, for example, to a state in which the I/O access routing units of apparatuses are aware of each other's existence and notification destination, and each I/O access routing unit is capable of exchanging information with the I/O access routing unit of another apparatus as appropriate. The information indicates whether a control application is connected to the corresponding apparatus (and if so, the information, state, and the like thereof) and whether a field device is connected to the corresponding apparatus (and if so, the information, state, and the like thereof). Accordingly, at the time of an instruction from a monitoring apparatus or the like, processing can be executed, or execution requested, for the appropriate recipient (the I/O access routing unit of the other apparatus). The I/O access routing unit 22 and the I/O access routing unit 32 determine the access method as follows, for example, in accordance with the physical positional relationship with the field device 10. The function provided by the I/O access routing unit 22 and the I/O access routing unit 32 is also referred to as an I/O access routing function.

(1) Designation of Memory Address:

An input/output unit of the field device 10 is normally allocated to a memory area of the I/O node 20. When the control application 21 of the I/O node 20 accesses the field device 10 that is directly connected to the I/O node 20, the I/O access routing unit 22 designates the address of the memory area corresponding to the input/output unit of the field device 10 with the I/O name indicated by the control application 21 and accesses the field device 10.

(2) Via the Network:

When the control application 31 of the controller 30 accesses the field device 10 connected to the I/O node 20, to which the controller 30 is connected over the network 40, the I/O access routing unit 32 transfers an input/output instruction, indicated together with an I/O name, from the control application 31 to the I/O node 20 via the network 40. The I/O access routing unit 22 of the I/O node 20 that receives the input/output instruction from the controller 30 designates the memory address corresponding to input/output of the field device 10 and accesses the field device 10. Also in the case of the control application 21 of the I/O node 20 accessing the field device 10A connected to another I/O node 20A, to which the I/O node 20 is connected over the network 40, the I/O access routing unit 22 transfers an input/output instruction from the control application 21 to the I/O node 20A via the network.

The input/output unit refers to the unit for one instance of inputting/outputting data for the field device 10. For example, in the case of the field device 10 being the sensor 11 that measures temperature, the temperature information outputted from the field device 10 can become the input/output unit. For example, if the field device 10 is a heater (actuator 12), and an instruction to raise the temperature to a predetermined set value is transmitted to the field device 10, then the information to be outputted to the field device 10 to indicate an operation instruction and a set temperature for the heater can become the input/output unit. The field device 10 can be accessed by one or a plurality of input/output units. The input/output destination of various input/output units of information of the field device 10 is referred to as I/O. I/O is, for example, a memory address.

(Processing by I/O Access Routing Unit)

Figure 3:
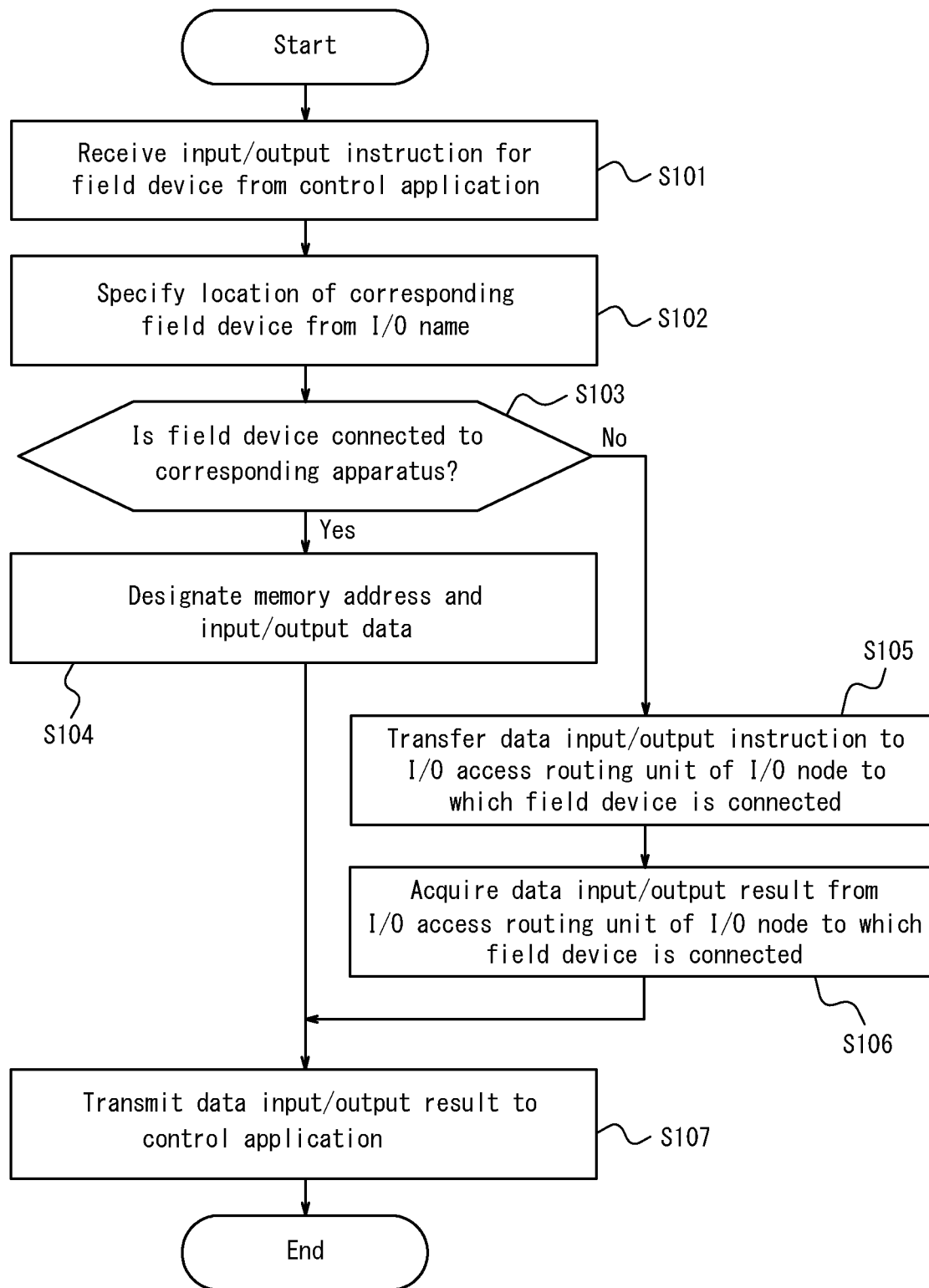
FIG. 3 is a flowchart illustrating an example of processing executed by an I/O access routing unit that has received an input/output instruction from a control application.
Figure 4:
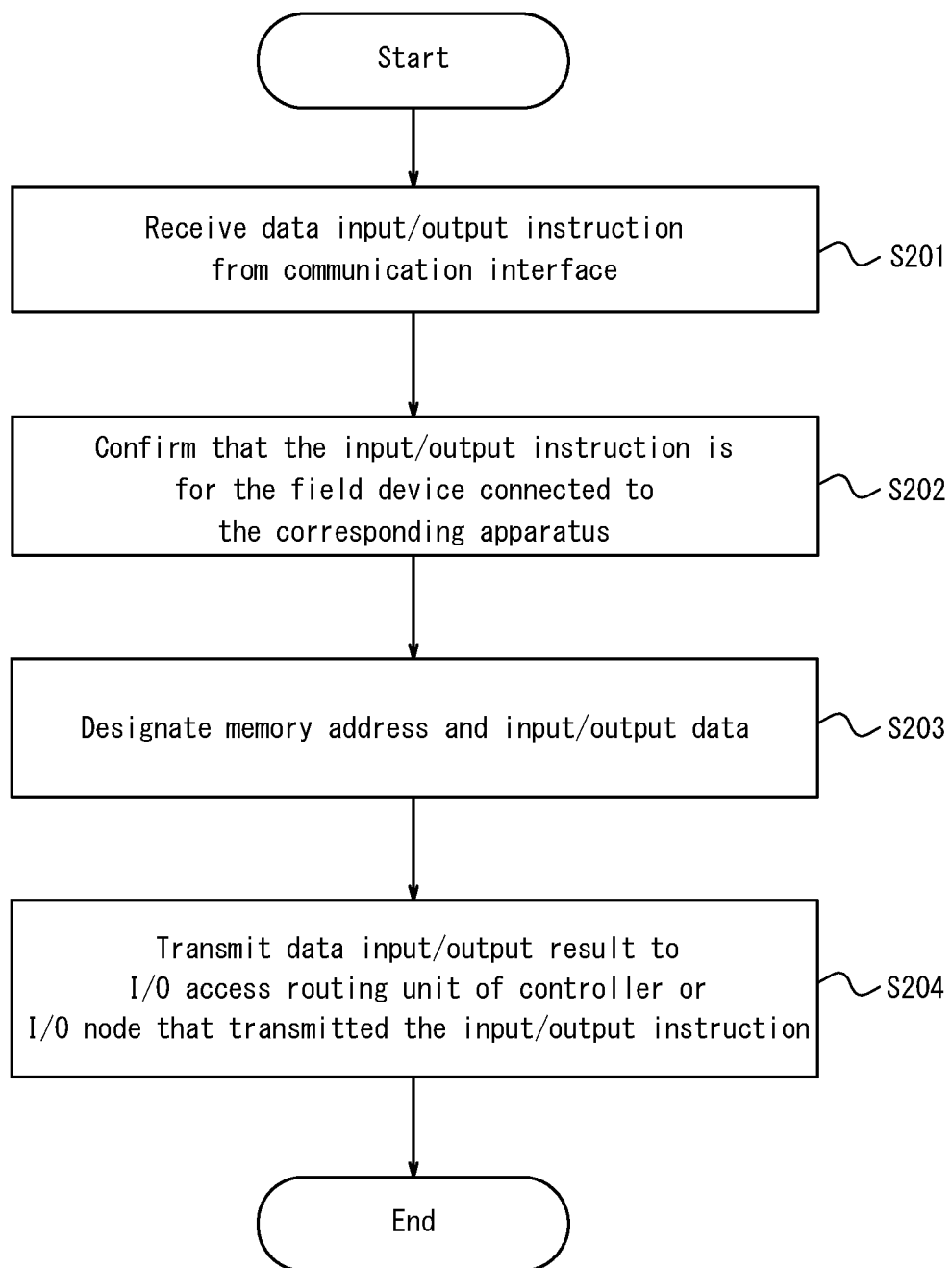
FIG. 4 is a flowchart illustrating an example of processing executed by an I/O access routing unit that has received an input/output instruction from a communication interface.

With reference to FIGS. 3 and 4, an example of processing executed by the I/O access routing units 22, 32 is described. FIG. 3 illustrates the processing executed by the I/O access routing unit 22, 32 after receipt of an instruction from the control application 21, 31. FIG. 4 illustrates the processing executed by the I/O access routing unit 22 after the communication interface 24 of the I/O node 20 receives an input/output instruction from another I/O node 20A or the controller 30 via the network 40 and the I/O access routing unit 22 receives the input/output instruction from the communication interface 24.

First, in FIG. 3, the I/O access routing unit 22, 32 receives a unique name, as an abstraction of the I/O of the field device 10, and an input/output instruction for the field device 10 from the control applications 21, 31 (step S101). A name defined to be exclusive within the system can be used as the unique name. The unique name for I/O is referred to below as the I/O name. The control application 21, 31 performs access by designating the I/O name allocated to the I/O, rather than by designating the physical position of the field device 10 or the IP address of the I/O node 20 to which the field device 10 is connected. In this way, the control application 21, 31 can specify the I/O of the field device 10 for input/output by the same method, regardless of the physical positional relationship and the connection relationship to the field device 10.

Next, the I/O access routing unit 22, 32 specifies position information for the corresponding field device 10 based on the I/O name received from the control application 21, 31 (step S102). The position information for the field device 10 can be substituted by the route that connects to the field device 10. The position information for the field device 10 includes information for the I/O node 20 to which the field device 10 is connected. The field device 10 corresponding to the I/O name and the corresponding position information can be specified by various methods. For example, each I/O access routing unit 22, 32 can be provided with a conversion table that indicates a correspondence relationship between the I/O name, the field device 10, and the corresponding position information. Alternatively, a management server that stores the correspondence between the I/O name, the field device 10, and the corresponding position information can be provided on the network 40. The management server can be configured to return position information for the field device 10 in response to an inquiry, from the I/O access routing unit 22, 32, that uses the I/O name.

Upon specification of the position information for the corresponding field device 10 based on the I/O name, the I/O access routing unit 22, 32 judges whether the field device 10 is connected to the corresponding apparatus (step S103).

When the field device 10 corresponding to the I/O name is connected to the corresponding apparatus in step S103 (step S103: Yes), the I/O access routing unit 22, 32 proceeds to step S104. In this case, the corresponding apparatus is the I/O node 20. The I/O access routing unit 22 designates the memory address corresponding to the I/O name, accesses the I/O, and performs input/output of data (step S104).

When the field device 10 corresponding to the I/O name is not connected to the corresponding apparatus in step S103 (step S103: No), the I/O access routing unit 22, 32 proceeds to step S105. The field device 10 corresponding to the I/O name is assumed below to be the field device 10A of FIG. 1. In this case, the I/O access routing unit 22, 32 transfers a data input/output instruction from the control application 21, 31 to the I/O access routing unit 22 of the other I/O node 20A to which the field device 10A corresponding to the I/O name is connected (step S105). In other words, the I/O access routing unit 22, 32 controls the route so that the input/output from the control application 21, 31 is routed to the I/O node 20A to which the field device 10A corresponding to the I/O name is connected.

On the other I/O node 20A that received the input/output instruction, the I/O access routing unit 22 accesses the I/O in response to the instruction received from the communication interface 24 (see FIG. 4). The I/O access routing unit 22 of the I/O node 20 or the I/O access routing unit 32 of the controller 30 acquires the data input/output result from the I/O access routing unit 22 of the other I/O node 20A to which the field device 10A corresponding to the I/O name is connected (step S106).

After step S104 or step S106 is completed, the I/O access routing unit 22, 32 transfers the data input/output result to the control application 21, 31 (step S107).

Next, the processing executed by the I/O access routing unit 22 in response to the instruction received from the communication interface 24 is described with reference to FIG. 4. Upon the communication interface 24 of the I/O node 20 receiving the input/output instruction from the other I/O node 20 or the controller 30, the I/O access routing unit 22 of the I/O node 20 receives the data input/output instruction from the communication interface 24 (step S201). The I/O access routing unit 22 that received the input/output instruction from the communication interface 24 confirms whether the input/output instruction is an input/output instruction for the field device 10 connected to the I/O node 20 of the I/O access routing unit 22 (step S202).

Next, the I/O access routing unit 22 that received the input/output instruction from the communication interface 24 designates a memory address and accesses the I/O to perform input/output of data (step S203). After step S203, the I/O access routing unit 22 transmits the data input/output result, via the communication interface 24, to the I/O access routing unit 22 of the I/O node 20 or the I/O access routing unit 32 of the controller 30 that transmitted the input/output instruction (step S204).

For example, the I/O node 20A of FIG. 1 may receive an input/output instruction for the field device 10A from the I/O node 20, which corresponds to step S105 of FIG. 3. In this case, the I/O access routing unit 22 of the I/O node 20A designates a memory address and performs input/output of data in response to the instruction received from the communication interface 24 of the I/O node 20A. The I/O access routing unit 22 of the I/O node 20A transmits the data input/output result, via the communication interface 24 of the I/O node 20A, to the I/O access routing unit 22 of the I/O node 20 that transmitted the input/output instruction.

In this way, the control application 21, 31 can access I/O by an abstract I/O name, without specifying position information of the field device 10 or the I/O node 20 to which the field device 10 is connected. The control application can thereby access the I/O by the same method, regardless of the physical positional relationship between the field device 10 and the I/O node 20 or controller 30 on which the control application is installed.

(Migration of Control Application)

Figure 5:
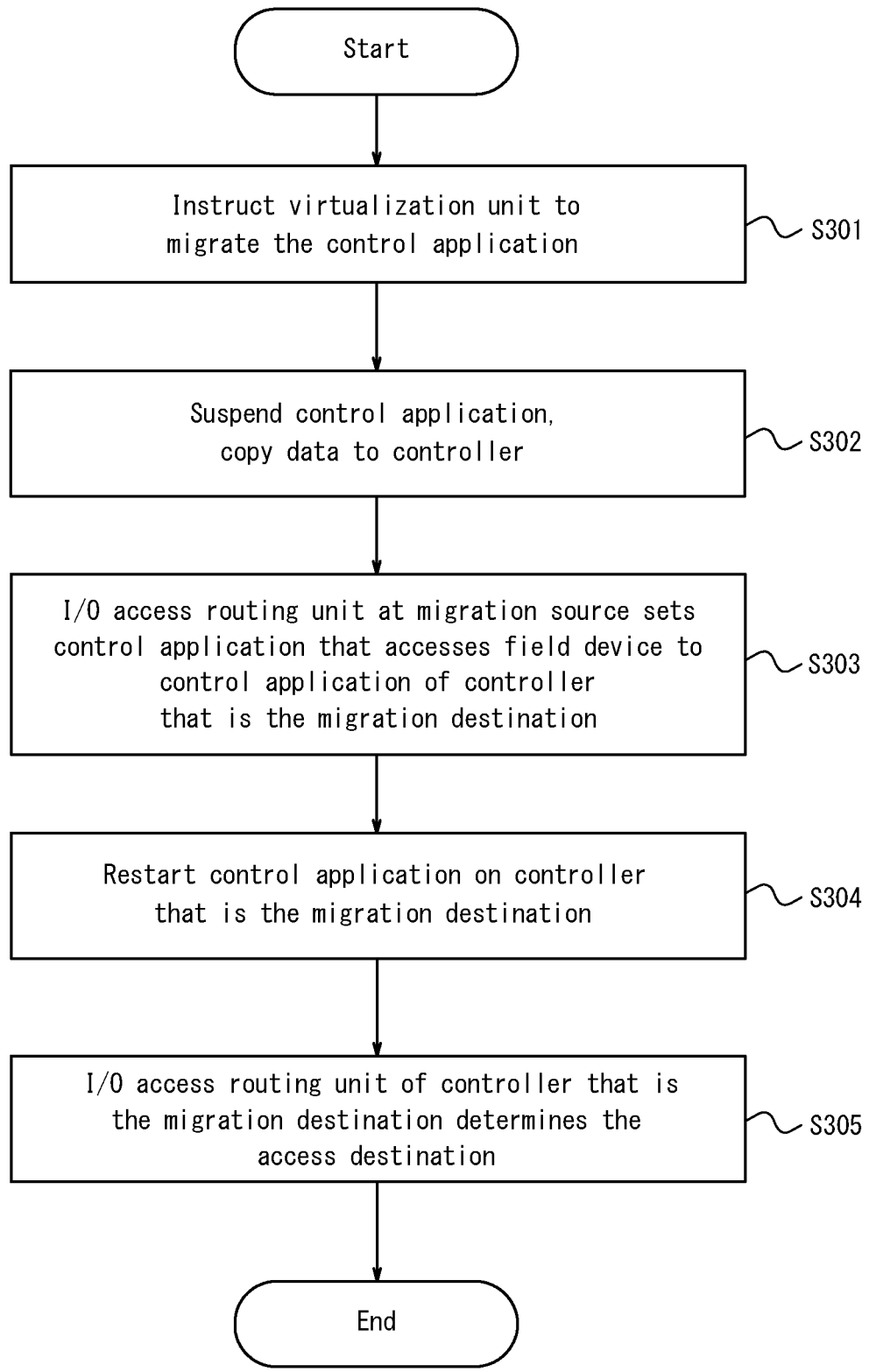
FIG. 5 is a flowchart illustrating example procedures for migrating a control application from an I/O node to a controller.

Next, the processing for migration of the control application 21 from the I/O node 20, to which the field device 10 targeted for control is connected, to the controller 30 is described with reference to the flowchart in FIG. 5. In this case, the I/O access method changes from memory address designation to access over the network. A general live migration mechanism can be used for the actual migration of the control application 21. The target of migration is only the control application 21. The virtualization unit 25 and the I/O access routing unit 22 are not migrated.

First, the control application 21 on the I/O node 20 is instructed to migrate (step S301). The instruction to migrate may, for example, be provided from the monitoring apparatus 45 by the operator of the control system 1 or may be issued automatically from the monitoring apparatus 45 in response to a certain operation by a certain apparatus in the control system 1. The instruction to migrate is, for example, issued to the virtualization unit 25 of the I/O node 20. The following processing by each apparatus may be performed under the control of the monitoring apparatus 45.

The virtualization unit 25 of the I/O node 20 that received the instruction to migrate temporarily suspends operations of the control application 21 and copies data necessary for restarting operations to the controller 30 that is the migration destination (step S302).

The I/O access routing unit 22 of the I/O node 20 sets the position of the control application 31 that accesses the field device 10 to the controller 30 that is the migration destination, thereby enabling access over the network (step S303). The control application 31 executes the same processing on the controller 30 as the control application 21. Step S303 may be executed in parallel with step S302.

Upon the necessary data being copied to the controller 30 that is the migration destination, the control application 31 starts the processing again (step S304). The control application 31 provides the input/output instruction indicated along with the I/O name to the I/O access routing unit 32.

The I/O access routing unit 32 automatically determines the access destination for controlling the field device 10 based on the I/O name designated by the control application 31 (step S305). For example, the correspondence between the I/O name and the position information for the field device 10 is stored in advance in the I/O access routing unit 32 as a conversion table. It is therefore unnecessary for settings or the like to be changed manually or by a specifically created program in step S305.

Figure 6:
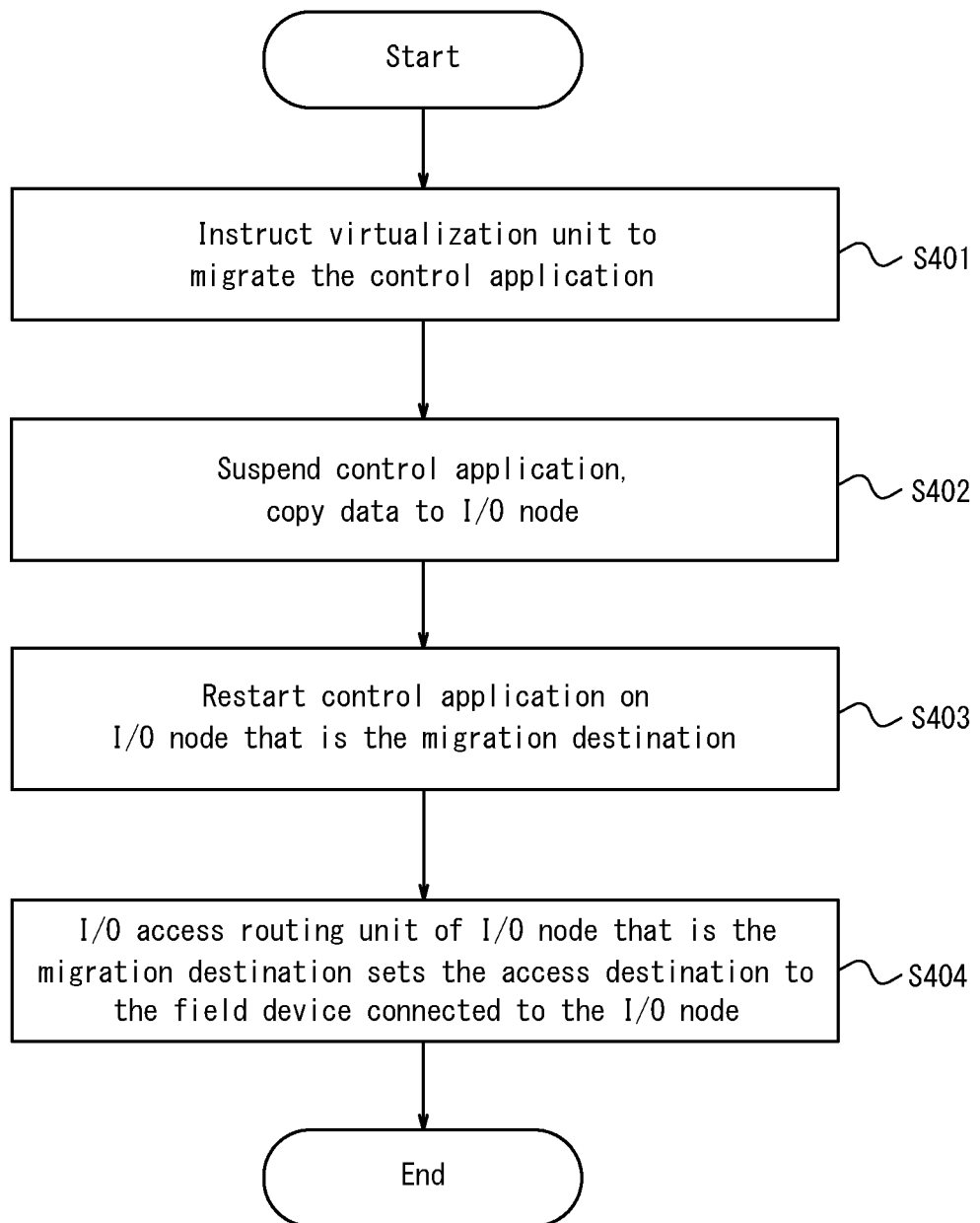
FIG. 6 is a flowchart illustrating example procedures for migrating a control application from a controller to an I/O node.

Next, the processing for migration of the control application 31 from the controller 30 to the I/O node 20, to which the field device 10 targeted for control is connected, is described with reference to the flowchart in FIG. 6. In this case, the I/O access method changes from access over the network to memory address designation. A description of points in common with the flowchart in FIG. 5 is omitted.

First, the control application 31 on the controller 30 is instructed to migrate (step S401).

A virtualization unit 34 of the controller 30 that received the instruction to migrate temporarily suspends operations of the control application 31 and copies data necessary for restarting operations to the I/O node 20 that is the migration destination (step S402).

Upon the necessary data being copied to the I/O node 20 that is the migration destination, the control application 21 that executes the same processing as the control application 31 starts the processing again on the I/O node 20 (step S403).

Upon the control application 21 of the I/O node 20 starting the processing again, the I/O access routing unit 22 of the I/O node 20 judges whether the access destination is the field device 10 connected to the I/O node 20 based on the I/O name designated by the control application 21. The I/O access routing unit 22 sets the access destination of the control application 21 to the field device 10 connected to the I/O node 20 (step S404). Subsequently, the I/O access routing unit 22 performs the input/output of the input/output instruction, received together with the I/O name from the control application 21, on the memory address connected to the field device 10.

In this way, the control system 1 enables switching between a state such that the control application 21 accesses the field device 10 (first state) and a state such that the control application 31 accesses the field device 10 (second state). This configuration thereby enables switching of the control applications 21, 31 between different apparatuses, i.e. the I/O node 20 and controller 30, without awareness of the change in the position of the control applications 21, 31. The control applications are not limited to being switched between the I/O node 20 and the controller 30. The operating control application can be switched between different I/O nodes 20 or different controllers 30.

(Forcing)

In general, since the target input/output unit of information becomes inaccessible from the I/O node when a field device is to be replaced, a function is known to fix the value of the information acquired by I/O within the I/O node by rewriting the value to a designated value. This separates the acquired value from the value of the input/output unit of information corresponding to actual I/O. Such a function is referred to as forcing, I/O locking, or the like. The control application continues to operate as though it were accessing the I/O even while the field device is being replaced.

This forcing function is provided to the I/O access routing unit 22 of the I/O node 20 in the control system 1, thereby achieving a similar function even in a system configuration such that the controller 30 and the I/O node 20 are connected by the network 40. Specifically, when the field device 10 is to be replaced, the I/O access routing unit 22 fixes the input/output data, stored in the memory area for I/O of the I/O node 20, corresponding to the input/output unit of the field device 10.

As described above, the control application 21, 31 of the present embodiment can access I/O using an appropriate method by designating the I/O name, without concern for the position of the control application 21, 31 itself or the method of accessing the field device 10. The control application 21, 31 that controls the field device 10 can also continue to access the field device 10 even when switched or migrated to any controller 30 or other I/O node 20A. Furthermore, the optimal method for accessing I/O can be selected by the I/O access routing units 22, 32 working together. Consequently, no unnecessary processing load or communication load occurs due to migration or the like of the control applications 21, 31.

Second Embodiment

Figure 7:
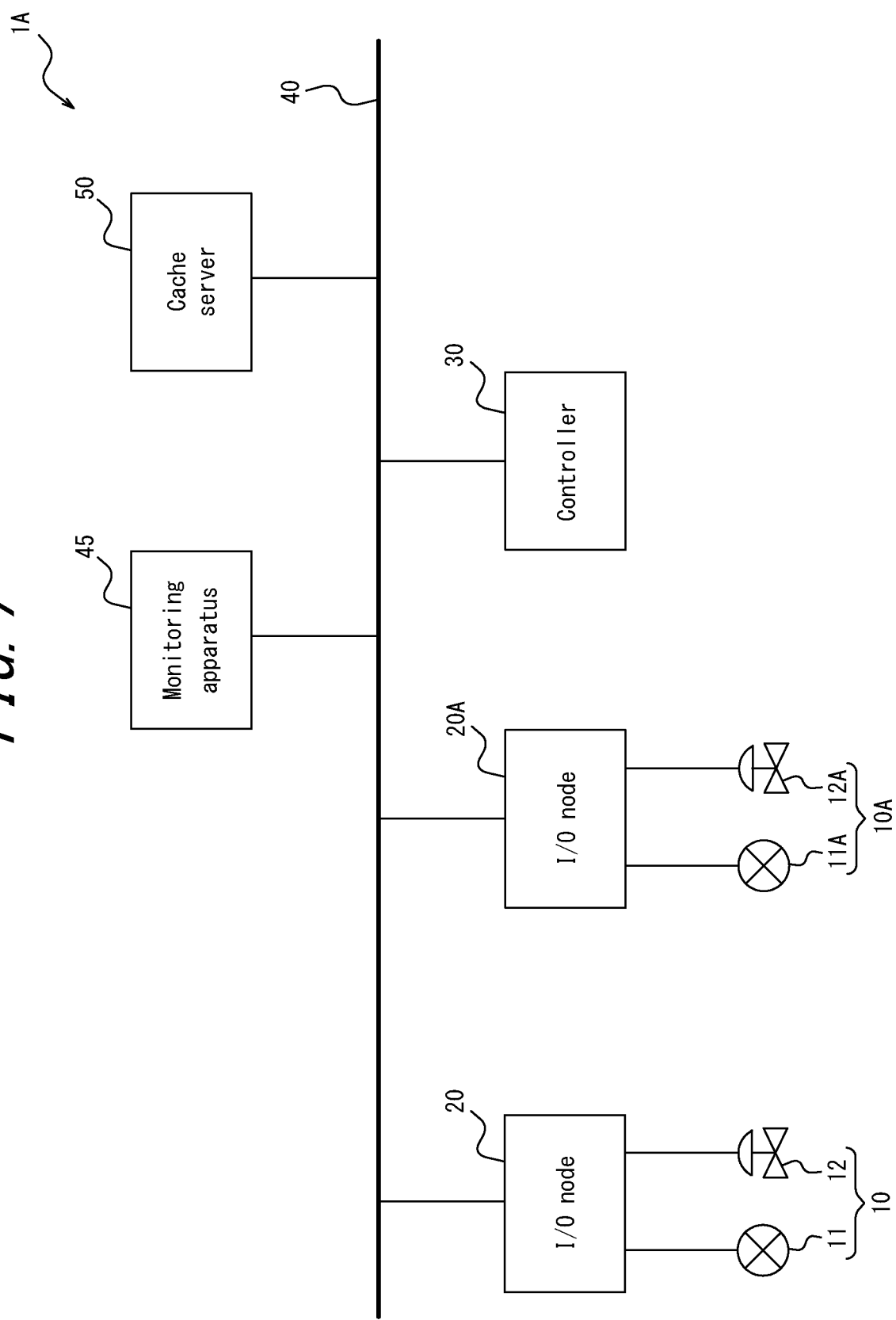
FIG. 7 is a schematic diagram illustrating an example control system according to a second embodiment.

A control system 1A according to a second embodiment has the configuration of the control system 1 of the first embodiment, with the addition of a cache server 50 connected to the network 40, as illustrated in FIG. 7. The cache server 50 includes a function to cache previously accessed input/output data. The controller 30 connected to the network 40 can access the field device 10 via the cache server 50.

Figure 8:
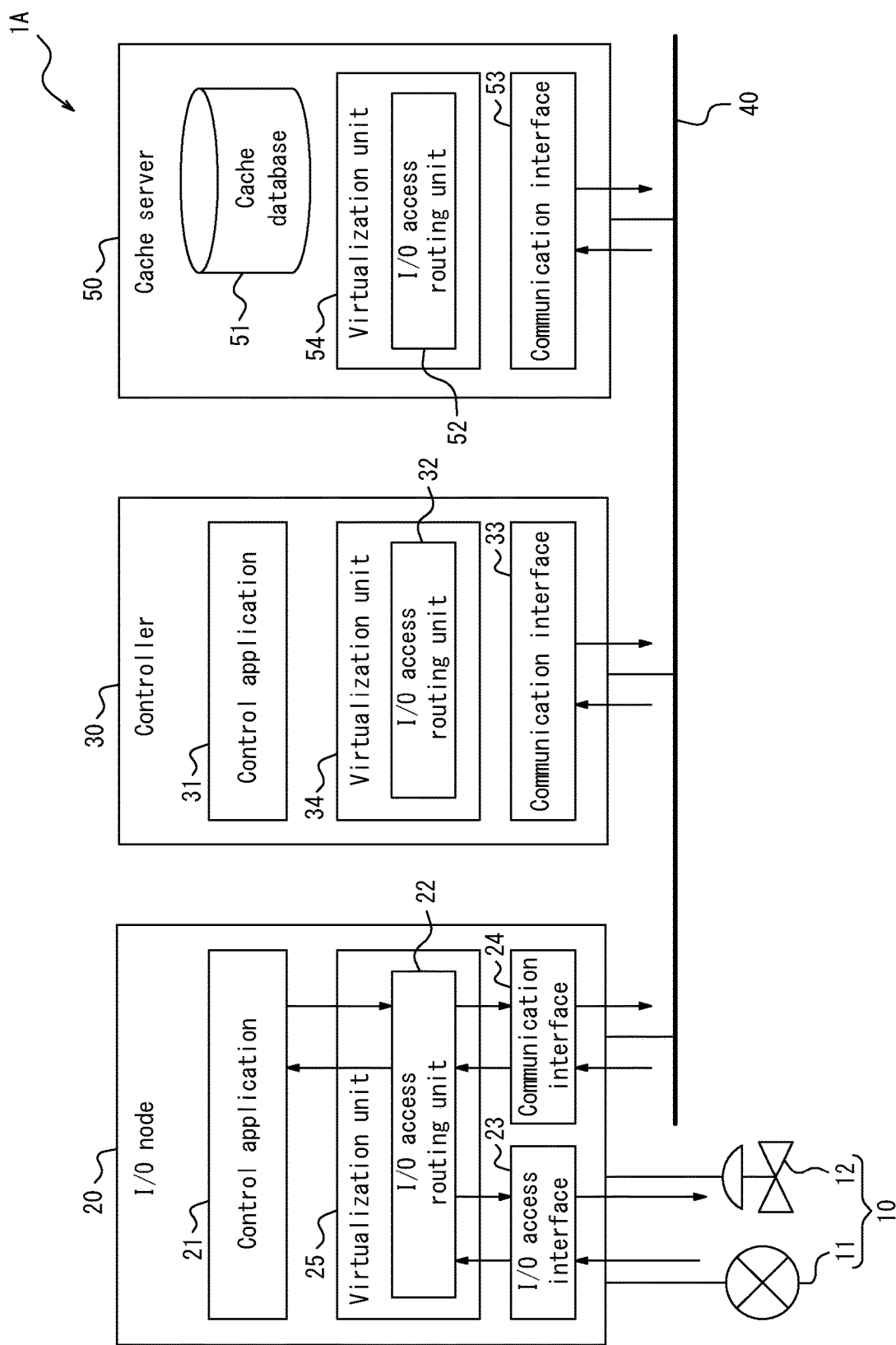
FIG. 8 is a block diagram illustrating an example configuration of the main portion of the control system of FIG. 7.

FIG. 8 illustrates an example configuration of the main portion of the control system 1A. The I/O node 20 and the controller 30 are the same as the I/O node 20 and the controller 30 of the first embodiment illustrated in FIG. 2. The same reference signs as the first embodiment are therefore assigned, and a description is omitted.

The cache server 50 includes a cache database 51, an I/O access routing unit 52, and a communication interface 53. The I/O access routing unit 52 may be included in a virtualization unit 54. The cache database 51 is a memory. The I/O access routing unit 52 is a third access route controller.

The cache database 51 can store the input/output data for I/O corresponding to the input/output unit of one or more field devices 10. The input/output data may include current and past data. The cache database 51 may include a semiconductor memory, a magnetic storage apparatus, a photo-magnetic storage apparatus, or the like capable of storing a large volume of data.

The I/O access routing unit 52 works together with the I/O access routing units 22, 32 of the other apparatuses to control the route of input/output for I/O so that all or a portion of access to the I/O node 20 is routed to the cache server 50. For example, the I/O access routing unit 22 transmits input/output data for the field device 10 to the I/O access routing unit 52. The I/O access routing unit 52 stores the input/output data received from the I/O access routing unit 22 in the cache database 51. The I/O access routing units 22, 32, 52 work together and transfer the input/output instruction for the field device 10 from the control application 31 to the cache server 50.

The field device 10 or the I/O node 20 might not have as high a processing capability as the controller 30. The field device 10 or the I/O node 20 might therefore not be able to handle a high volume of access from a plurality of control applications 21, 31. In such cases, the I/O access routing unit 22 of the I/O node 20 exchanges data only with the cache server 50. Other controllers 30 perform input/output to and from the cache server 50. Hardware with a high processing capability that can easily handle a high volume of access can be used in the cache server 50.

The communication interface 53 is configured to be identical or similar to the communication interface 24 and the communication interface 33.

The cache server 50 is, for example, used in the following configurations.

1. Use of Cache Server Based on I/O Access Load

The I/O access routing unit 22 of the I/O node 20 monitors the input/output load for the connected field device 10. When the load of the I/O node 20 satisfies a predetermined condition, the I/O access routing unit 22 of the I/O node 20 may route an input/output instruction for the field device 10 to the cache server 50. When input/output from a plurality of control applications 21, 31 is concentrated on a particular I/O node 20, the processing load may increase to the point where the I/O node 20 cannot respond in real time. In such a case, the I/O access routing unit 22 instructs the I/O node 20A and the controller 30 to change the access method to access via the cache server 50. In the subsequent processing, the I/O node 20 transfers the input/output data to the cache server 50 and does not communicate with the other I/O node 20A or the controller 30.

By communicating only with the cache server 50, the I/O node 20 can handle input/output within its processing capability. The processing load therefore does not increase, enabling the I/O node 20 to continue responding in real time. Although access from the control applications 21, 31 to the cache server 50 is concentrated, cached data can be used to reduce the communication load with the I/O node 20. A predetermined priority may be assigned to data when the data is stored in the cache data server, and the I/O node 20 may then retrieve data in order of priority.

2. Distributed Access Based on Purpose for Accessing I/O

The I/O access routing unit 22 of the I/O node 20 can distribute input/output based on the purpose for accessing input/output to the I/O. For example, the control applications 21, 31 can be set to perform input/output directly with the field device 10 via the I/O node 20 to which the field device 10 is connected when input/output is used to control the I/O. The control applications 21, 31 can be set to refer to data stored in the cache server 50 when input/output is used for monitoring the I/O.

In the case of I/O being controlled, in particular in the case of data being inputted or overwritten to the I/O for operations, a real-time response is required, but access is not highly concentrated. The control application 21, 31 can therefore preferably access the I/O node 20 directly without going through the cache server 50. In the case of output data of the I/O being used for monitoring by the monitoring apparatus 45 or the like, a real-time response is not very necessary, but access from many apparatuses is sometimes concentrated on the same I/O node 20. The control applications 21, 31 can therefore preferably access output data of the I/O through the cache server 50.

(Forcing)

Figure 9:
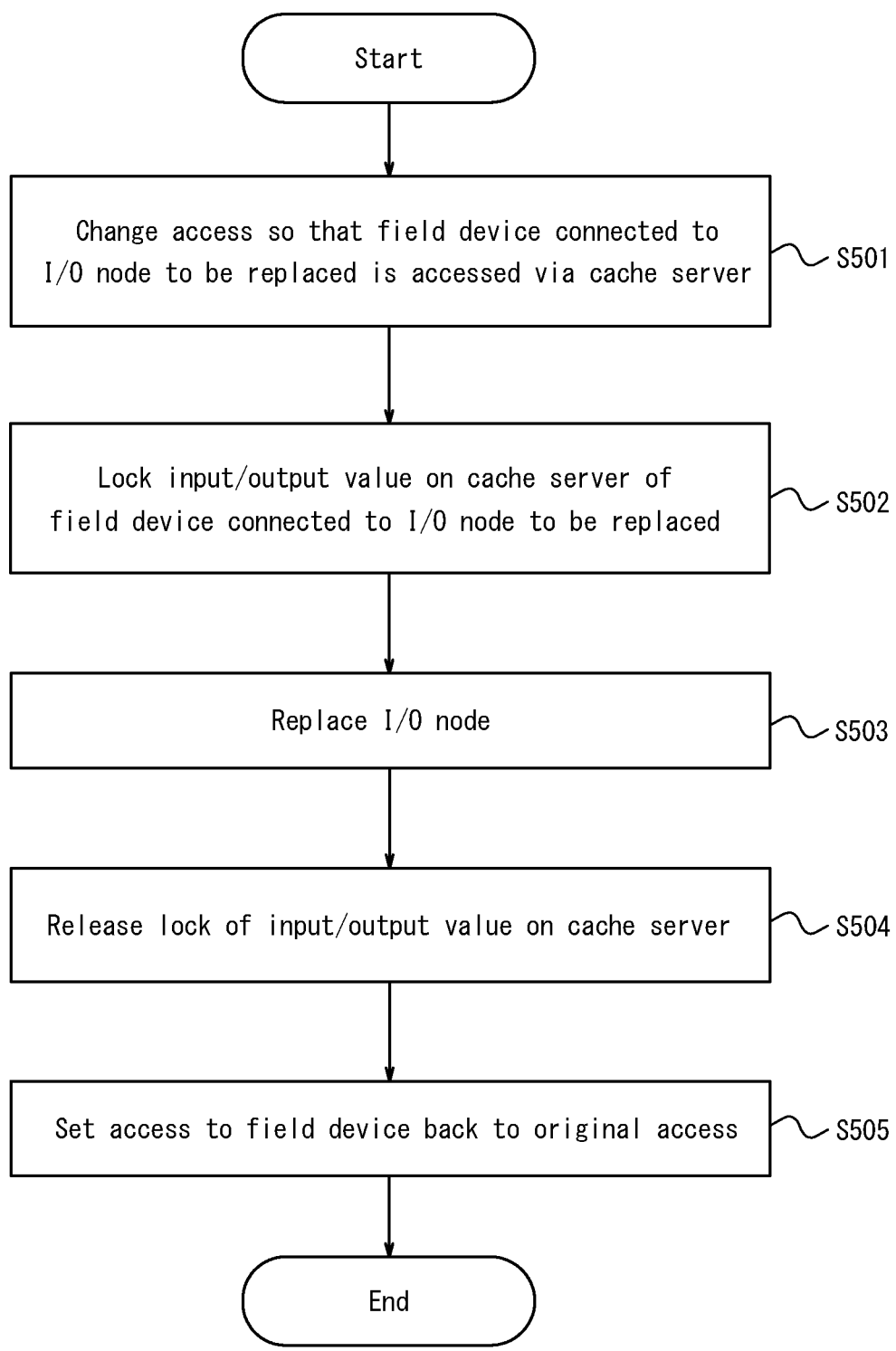
FIG. 9 is a flowchart illustrating an example of procedures for replacing an I/O node.

In the control system 1A according to the present embodiment, the cache server 50 can be provided with a forcing function for when the I/O node 20 is replaced. Procedures for replacing the I/O node 20 in the control system 1A are described with reference to FIG. 9.

First, the controller 30 or the monitoring apparatus 45 notifies other I/O access routing units to change the method for accessing the I/O of the field device 10, connected to the I/O node 20 to be replaced, from access via the I/O access routing unit 22 to access via the cache server 50 (step S501). The I/O access routing unit 22 of the I/O node 20 sequentially transfers the input/output unit of information acquired from the I/O to the cache server 50. In this way, the access from the control application 31 to the I/O is routed to the cache server 50. The control application 31 accesses the I/O of the field device 10 of the I/O node 20 via the cache database 51 of the cache server 50.

Next, the value of the input/output unit of information of the field device 10 connected to the I/O node 20 to be replaced is locked on the cache server 50 (step S502). In other words, the value (input/output data) of the input/output unit of information on the cache server 50 is separated from the actual value of the input/output unit of information acquired from the I/O, and a fixed value is provided to the control application 31 until the lock is released.

The operator of the control system 1A or another operator replaces the I/O node 20 to be replaced (step S503).

When replacement of the I/O node 20 is complete, the I/O lock is released on the cache server 50 by input from an operator or worker, or by the control system 1A detecting completion of the replacement operation (step S504).

After the I/O lock is released on the cache server 50, the method of accessing I/O corresponding to the input/output unit of the field device 10 returns to the original method on the I/O access routing unit 32 (step S505). The control application 31 of the controller 30 can thereby access the I/O node 20 via the network 40.

The above-described configuration enables the control system 1A according to the second embodiment to distribute the processing load of the I/O node 20, to which the field device 10 is connected, temporally and/or in accordance with the purpose of access. The I/O node 20 can also be replaced without the need for the entire system to be stopped in the control system 1A according to the second embodiment.

Third Embodiment

Figure 10:
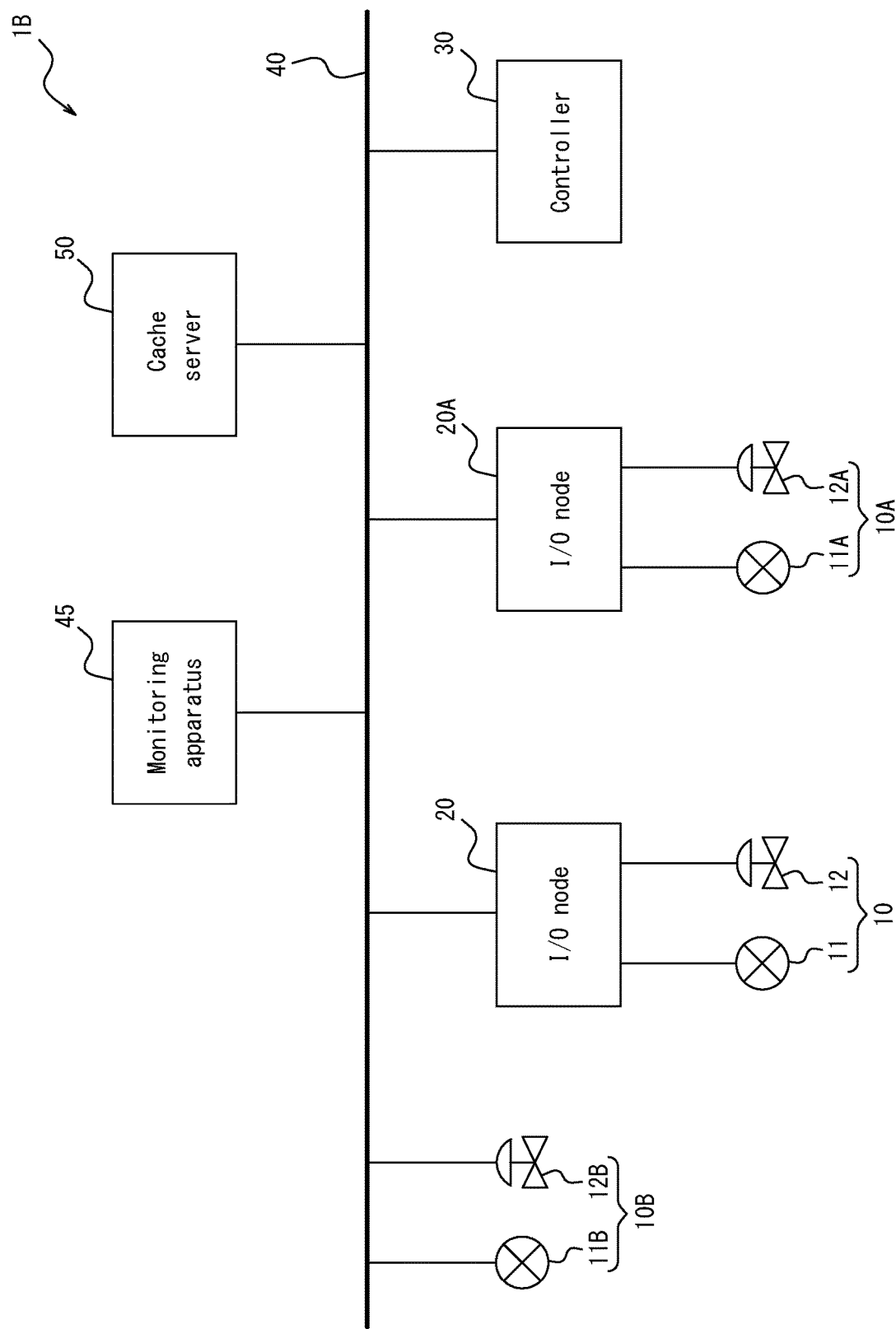
FIG. 10 is a schematic diagram illustrating an example control system according to a third embodiment.

FIG. 10 illustrates a control system 1B according to a third embodiment. The control system 1B includes the constituent elements of the control system 1 according to the first embodiment, with the addition of a field device 10B (sensor 11B, actuator 12B) directly connected to the network 40. Furthermore, the control system 1B may include a cache server 50, like the second embodiment. The field device 10B is a second field device. An Internet of Things (IoT) sensor or the like is envisioned as the field device 10B. In this case, a low-cost general-purpose device could be used. It is therefore envisioned that the field device 10B itself cannot be provided with an I/O access routing function.

In such a case, the I/O access routing unit 22 on the I/O node 20 or the I/O access routing unit 32 on the controller 30 may be configured to be capable of accessing the field device 10B, using a communication protocol with which the field device 10B can communicate, to perform input/output. Examples of the communication protocol by which the field device 10B can communicate include OPC UA, PROFINET, Modbus/TCP, MQTT, and HTTP. Furthermore, the I/O access routing units 22, 32 are configured to be capable of controlling the input/output route to enable input/output between the control applications 21, 31 and the field device 10B. For example, the I/O access routing unit 32 of the controller 30, which cannot perform input/output on the field device 10, may transfer an input/output instruction from the control application 31 to the I/O access routing unit 22 of the I/O node 20, which can perform input/output on the field device 10B. With this configuration, the field device 10B, such as an IoT device connected directly to the network 40, can be incorporated in the control system 1B of the present disclosure and controlled.

When the control system 1B includes the cache server 50, an I/O access routing unit 55 of the cache server 50 may access the field device 10B. The I/O node 20 or the controller 30 performs input/output to and from the field device 10B via the cache server 50. In this case, communication between only the field device 10B and the cache server 50 by the aforementioned communication protocol is sufficient. Processing for protocol conversion or the like need not be performed by each of the I/O nodes 20 and the controller 30.

Fourth Embodiment

Figure 11:
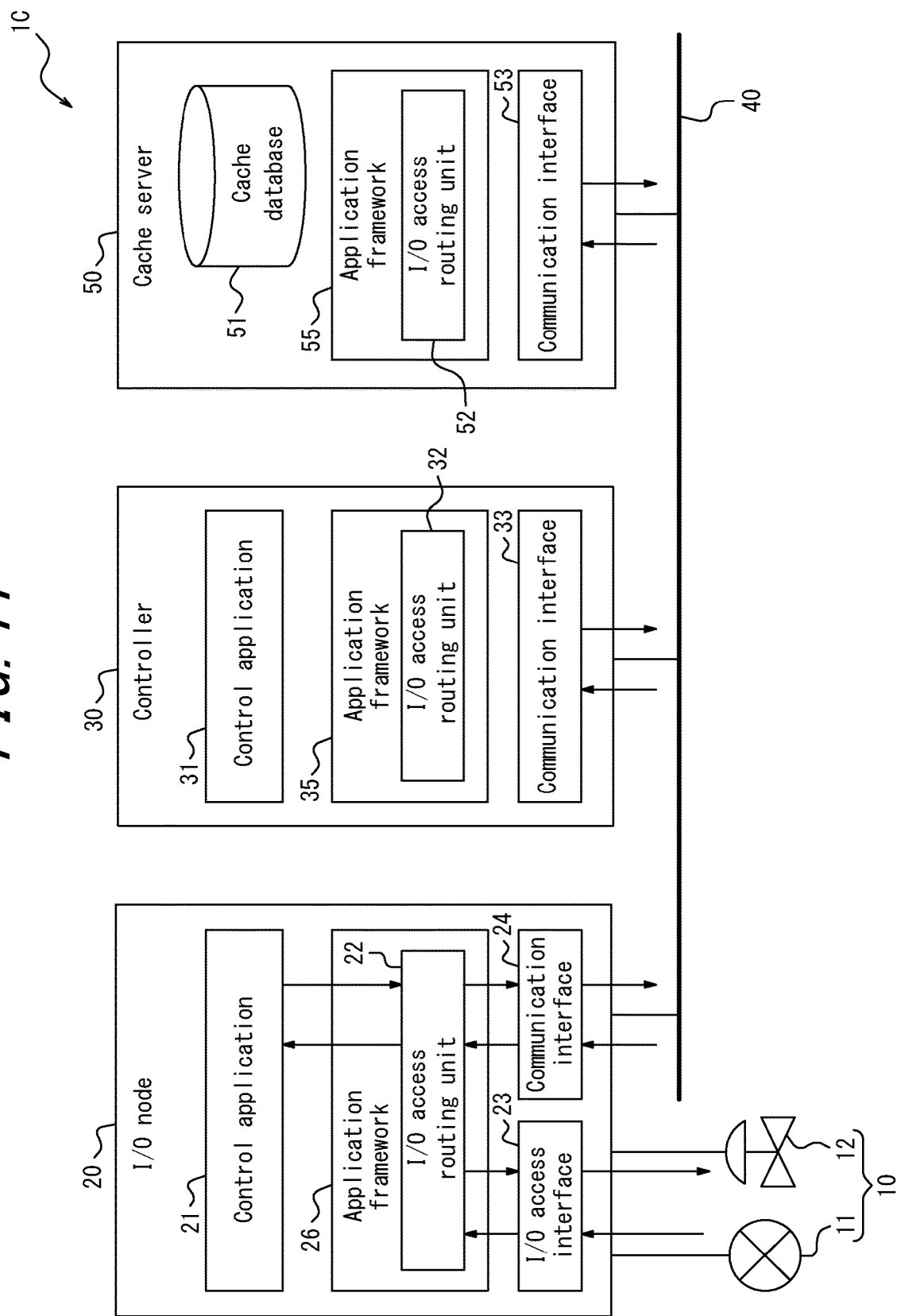
FIG. 11 is a block diagram illustrating an example configuration of the main portion of a control system according to a fourth embodiment.

As illustrated in FIG. 11, the I/O access routing units 22, 32, 52 of the apparatuses are respectively constructed on application frameworks 26, 35, 55 in a control system 1C according to a fourth embodiment. The control system 1C differs from the configuration of the control system 1A according to the second embodiment in that the I/O access routing units 22, 32, 52 are included in the virtualization units 25, 34, 54.

The application frameworks 26, 35, 55 are a collection of libraries used to implement standard structures for applications. The control applications 21, 31 and the cache database 51 can use the API provided by the application frameworks 26, 35, 55 to perform input/output for an abstract I/O. The application frameworks 26, 35, 55 change the access method in accordance with the positional information of the field device 10. The control applications 21, 31 need not be aware of the method of accessing the field device 10.

By use of the application frameworks 26, 35, 55 instead of the virtualization units 25, 34, 54, the same effects as when virtualization units are used can be obtained. Furthermore, since the application frameworks 26, 35, 55 are libraries, corrections and changes to the system are easy.

(Determination of Output Value Based on Plurality of Calculation Results)

In each of the above embodiments, the I/O access routing units 22, 32, 52 cooperate to control the input/output route for an input/output instruction from the control applications 21, 31 to the I/O in order to route the input/output instruction to an appropriate apparatus. The I/O access routing units 22, 32, 52 can be provided with a function to determine the control content for the field device 10 based on the calculation results from the plurality of control applications 21, 31.

Figure 12:
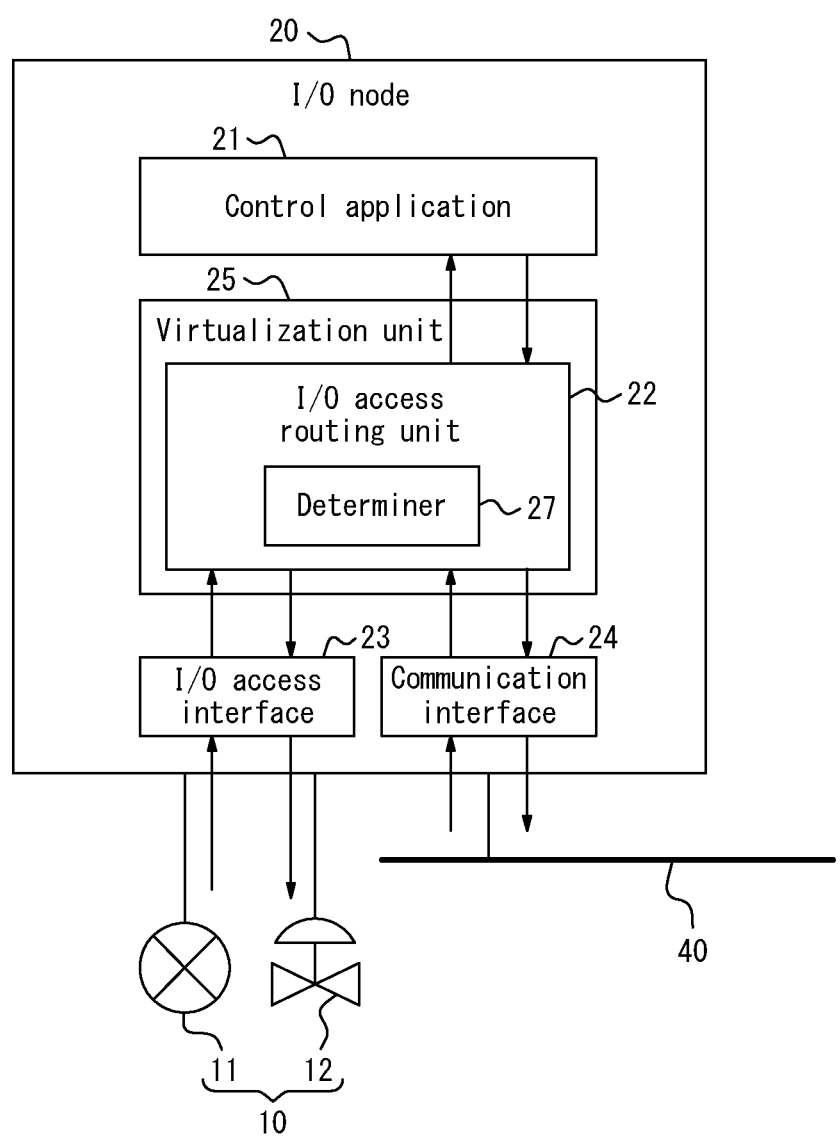
FIG. 12 is a block diagram illustrating an example of an I/O node that includes a determiner.

For example, in each of the above embodiments, a determiner 27 can be provided in the I/O access routing unit 22 of the I/O node 20, as illustrated in FIG. 12. It is assumed that, for example, a plurality of control applications including at least one of the control applications 21 and 31 perform the same control calculation based on the output of the sensor 11 and issue an instruction for input of the calculated input value to the actuator 12. The determiner 27 compares the plurality of input values calculated by the plurality of control applications, or statistically processes the plurality of input values, and determines a final input value. For example, the determiner 27 may determine the average of a plurality of output values as the input value. Alternatively, when there are three or more control applications, the determiner 27 may select the most frequent input value from among the plurality of input values.

This configuration can improve the reliability of control by the control systems 1, 1A, 1B.

Instead of being included in the I/O access routing unit 22, the determiner 27 may be positioned between the I/O access routing unit 22 and the field device 10.

Although embodiments of the present disclosure have been described through drawings and examples, those skilled in the art can make various changes and modifications based on the present disclosure. Accordingly, it is to be noted that specific configurations of the present disclosure are not limited to the embodiments of the present disclosure and include various modifications or changes within the spirit and scope of the present disclosure.

The invention claimed is:

1. A control system comprising:
one or more field devices configured to perform at least one of acquisition of data for control of a plant and operation of the plant;
a first control apparatus, to which a first field device included among the one or more field devices is directly connected, comprising a first access route controller and a first control application capable of controlling the first field device;

at least one second control apparatus comprising a second access route controller and a second control application capable of controlling the first field device; and a network configured to communicatively connect the first control apparatus and the second control apparatus, wherein the first access route controller and the second access route controller are configured to work together to control an input/output route from the first control application and the second control application to the first field device, and the first access route controller and the second access route controller are configured to be capable of switching between a first state such that the first control application performs input/output to and from the first field device and a second state such that the second control application performs input/output to and from the first field device.

2. The control system of claim 1, wherein the first access route controller and the second access route controller are configured so that a method for the first control application to specify an input/output unit of the first field device and a method for the second control application to specify an input/output unit of the first field device are identical.

3. The control system of claim 2, wherein the first control application and the second control application are configured to specify the input/output unit of the first field device by a unique name.

4. The control system of claim 2, wherein the input/output unit of the first field device is allocated to a memory area of the first control apparatus, and the first access route controller is configured to execute an input/output instruction for the first field device from the first control application and the second control application by designating an address of the memory area.

5. The control system of claim 4, wherein the second access route controller is configured to transfer the input/output instruction for the first field device from the second control application to the first access route controller via the network.

6. The control system of claim 4, wherein when the first field device is to be replaced, the first access route controller is configured to fix input/output data stored in the memory area.

7. The control system of claim 1, further comprising:
a second field device included among the one or more field devices and directly connected to the network, wherein
at least one of the first access route controller and the second access route controller is configured to be capable of input/output to and from the second field device, and
the first access route controller and the second access route controller are configured to be capable of controlling an input/output route from the first control application and the second control application to the second field device.

8. The control system of claim 1, wherein
the first control apparatus comprises a determiner,
a plurality of control applications including at least one of the first control application and the second control application are configured to perform an identical control calculation based on an output value from the first field device and calculate an input value for the first field device to yield a plurality of input values, and the determiner is configured to determine an input value for the first field device based on the plurality of input values calculated by the plurality of control applications.

9. The control system of claim 1, wherein
the first field device is not directly connected to the second control apparatus, and
the second access route controller transfers an input/output instruction from the second control application to the first control apparatus via the network, and the first access route controller of the first control apparatus transfers the input/output instruction from the second control application to the first field device directly connected to the first control apparatus.

10. A control apparatus having directly connected thereto a field device configured to perform at least one of acquisition of data for control of a plant and operation of the plant, the control apparatus comprising:
a control application capable of controlling the field device; and
an access route controller configured to work together with another access route controller included in another control apparatus, different from the control apparatus, to control an input/output route to the field device from the control application and a control application of the another control apparatus, wherein
the access route controller and the another access route controller are configured to be capable of switching between a first state such that the control application performs input/output to and from the field device and a second state such that a control application of the another control apparatus performs input/output to and from the field device.

11. The control apparatus of claim 10, wherein
the field device is not directly connected to the another control apparatus, and
the another access route controller transfers an input/output instruction from the control application of the another control apparatus to the control apparatus via a network, and the access route controller of the control apparatus transfers the input/output instruction from the control application of the another control apparatus to the field device directly connected to the control apparatus.

12. A method of accessing a field device to perform input/output by a control apparatus to and from a field device configured to perform at least one of acquisition of data for control of a plant and operation of the plant, the method comprising:
designating, by a control application of the control apparatus, an input/output unit of the field device and issuing an input/output instruction;
acquiring, by an access route controller of the control apparatus, position information for the designated field device; and
performing input/output, when the field device is connected to another control apparatus based on the position information, to and from the field device via an access route controller of the another control apparatus to which the field device is connected, wherein
the access route controller and an access route controller of the another control apparatus are configured to be capable of switching between a first state such that the control application performs input/output to and from the field device and a second state such that a control application of the another control apparatus performs input/output to and from the field device.

13. The method of claim 12, wherein
the field device is directly connected to the control apparatus,
the field device is not directly connected to the another control apparatus, and
the access route controller of the another control apparatus transfers an input/output instruction from the control application of the another control apparatus to the control apparatus via a network, and the access route controller of the control apparatus transfers the input/output instruction from the control application of the another control apparatus to the field device directly connected to the control apparatus.

* * * * *